April 2, 1968
E. R. FORSMAN ET AL
3,376,015
HIGH PRESSURE DISC VALVE
Filed Nov. 25, 1964
2 Sheets-Sheet 1
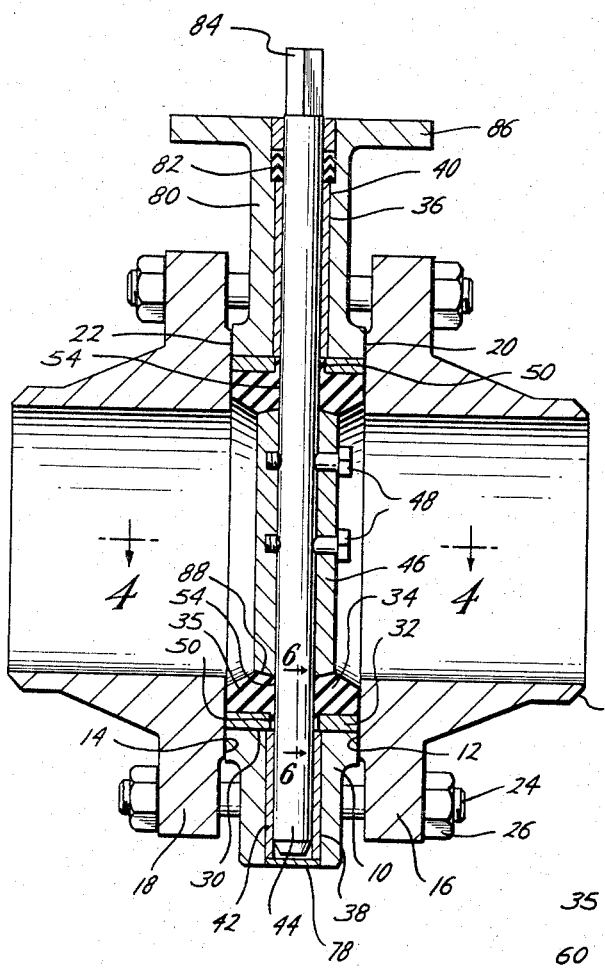
Earl R. Forsman
Samuel S. Clark
INVENTORS
BY Browning, Simms,
Hyer & Eickenroht
ATTORNEYS

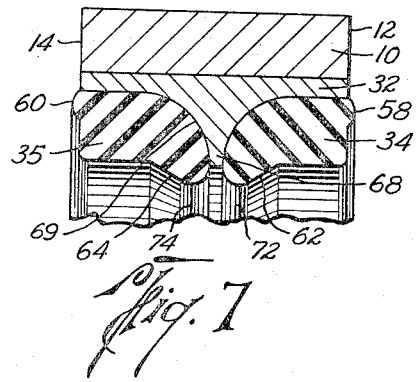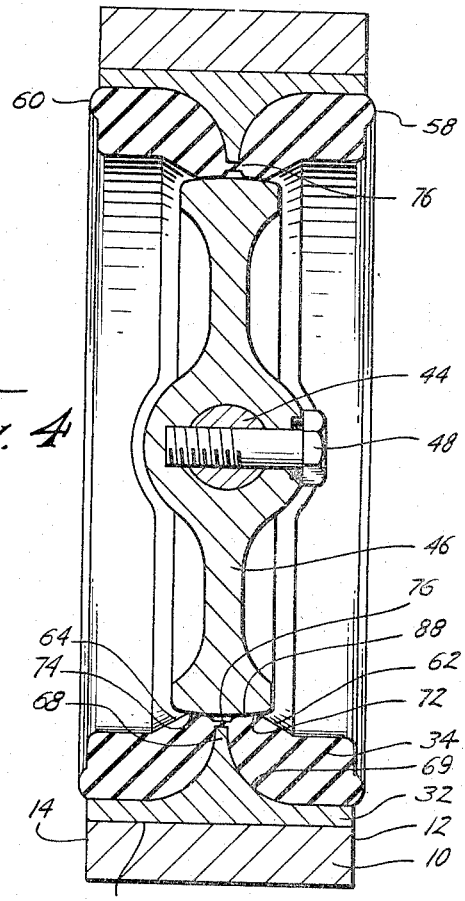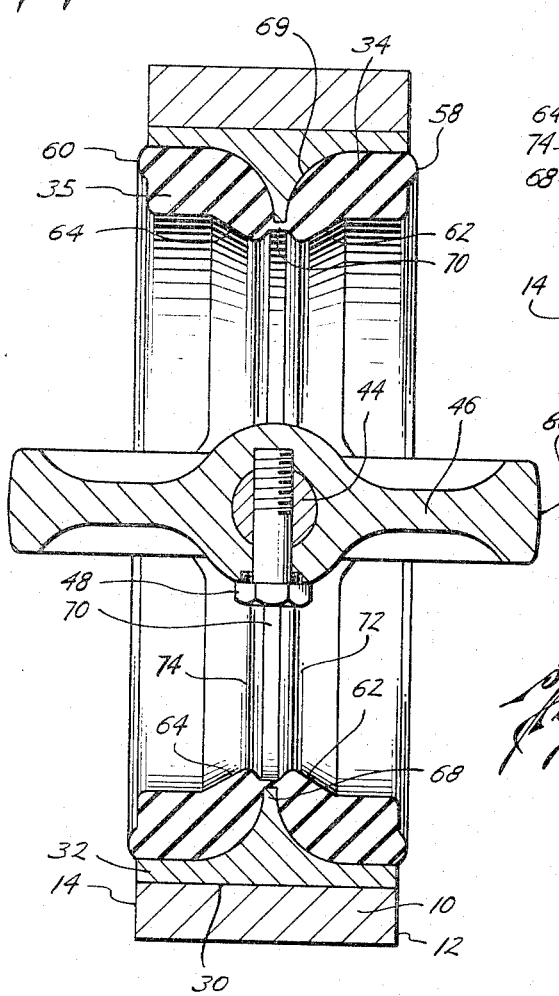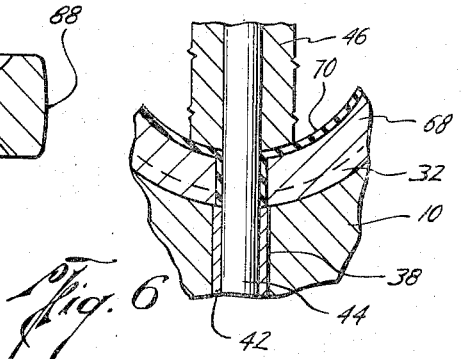

United States Patent Office 3,376,015
Patented Apr. 2, 1968

3,376,015
HIGH PRESSURE DISC VALVE
Earl R. Forsman and Samuel S. Clark, Houston, Tex.,
assignors to Keystone Valve Corp., Houston, Tex., a
corporation of Texas
Filed Nov. 25, 1964, Ser. No. 413,873
24 Claims. (Cl. 251—306)

ABSTRACT OF THE DISCLOSURE

The embodiment disclosed is a two-way, high pressure butterfly valve. The valve body slidably receives a seat assembly with a rigid outer base and an inwardly extending flange aligned with and slightly clearing the disc when closed, and resilient seat members against opposite sides of the flange having inner radii small enough to interfere with and close enough together to seat on the disc simultaneously. They are joined together by a thin protective web of elastomer across the flange, which web also clears the disc. Each seat member provides a pressure energized seal only when it is on the upstream side of the valve and is supported by the dam against extrusion past the disc. The downstream member will not hold high pressure, but is required for holding pressure in the other direction and, with the web over the dam, serves to protect the core and dam from contact with materials being handled.

---

This invention relates to disc valves and has for its general object the provision of a disc valve employing an elastomeric seat having all of the advantages of such disc valves heretofore devised but free from certain limitations heretofore limiting the conditions under which such valve might be employed.

In previously devised forms of such valves such as set forth by way of example in Stillwagon Patent No. 2,740,-423, the applications of the valve were limited to pressures insufficient to cause flowing of the valve seat member from its position surrounding the disc when the valve is closed and in a direction from the high pressure side of the disc to the low pressure side thereof. It has heretofore been proposed that the seat member be made to fit into an annular seat receiving recess therein on the upstream or high pressure side of the valve so that the valve body itself would prevent it from flowing past the disc, but such an arrangement, though enabling the valve to control greater pressures, made it limited in its application to unidirectional pressure differentials and necessitated properly orienting the valve when installing the same so that the valve seat member would be on the upstream side thereof. Furthermore, such an arrangement did not protect the valve body from contact with the material being handled and thus avoid the possibility of erosion or corrosion of the valve body or entrapment in the crevices therein of small amounts of the material being handled, the latter being highly objectionable when a valve is used for handling food materials or explosives.

It is therefore an object of this invention to provide a valve capable of withstanding much higher pressures than the valve of the aforesaid Stillwagon patent can withstand, to control such pressures in either direction so that such valves can be installed without regard for orientation and employed in situations in which pressures may reverse, and to provide such a valve in which the body of the valve may be protected at all times from contact with the material being handled.

Another object of this invention is to provide such a valve in which the elastomeric sealing member may be replaced with a minimum of difficulty and in which it may be replaced with a unitary assembly provided for such purpose.

Other objects and advantages of this invention will become apparent from the following description taken in connection with the accompanying drawings wherein is set forth by way of illustration and example one embodiment of the invention.

In the drawings:

FIG. 1 is a sectional view of the valve taken along a plane defined by the flow axis of the valve and the rotational axis on which the valve closure member is mounted.

FIG. 2 is a fragmentary view on an enlarged scale through the seat assembly of FIG. 1 showing the opening therethrough through which the operating stem of the valve is intended to fit when the valve is assembled, and cross-sectional shape of the annular seat members and base member of the valve seat assembly at such point.

FIG. 3 is an end face elevation of the seat assembly employed in the valve of FIG. 1 showing the same removed from the valve.

FIG. 4 is a view similar to FIG. 1 but on an enlarged scale, taken along the line 4—4 of FIG. 1, and showing the valve only, without the flange connections between which the valve in FIG. 1 is mounted, and in a plane at right angles to that of FIG. 1.

FIG. 5 is a view similar to FIG. 4 but showing the valve in open position instead of as in closed position as in FIG. 1.

FIG. 6 is a fragmentary sectional view taken along the line 6—6 of FIG. 1, but with the disc shown in open position.

FIG. 7 is a fragmentary sectional view similar to the upper portion of FIG. 5 but without the flash web across the dam, which appears in FIG. 5.

Referring now more in detail to the drawings, there is illustrated in FIG. 1 the complete valve in which the valve body 10 is provided with opposite plane end faces 12 and 14 adapted respectively to receive in close abutment therewith fittings such as the flanged fittings 16 and 18 whereby the valve may be connected within a conduit. The flange fittings 16 and 18 are likewise provided with plane end faces 20 and 22 adapted to engage respectively the end faces 12 and 14 of the valve body. The flanges 16 and 18 are adapted for securement to each other with the valve body 10 between them by suitable means such as the studs 24 and nuts 26 thereon extending through marginal portions of the flanges and interconnecting the same. The flanges themselves may be provided with means for securing them to adjacent pipe ends in any suitable fashion as by the beveling 28 intended for the reception of a welding bead to secure each flange to a pipe end. It will be understood that the means for securing the flanges to the pipe ends form no part of the present invention and that any suitable means for doing this may be employed.

Internally the body 10 has a flow passageway so that it is a tubular body, and its inner surface 30 is formed to receive a seat in a manner presently to be set forth. It will be understood that the cross section of this inner seat receiving surface may be such as the intended utilization of the valve may require, but that in most instances it would be of substantially uniform cross section throughout its length, with many if not most of such valves having such seat receiving surface of circular cross section and preferably cylindrical, although in certain instances other circular cross sections than cylindrical may be employed and the seat receiving surface may not be of uniform cross section throughout its length. In the preferred form illustrated the seat receiving surface is at least as large at one of its ends as at any intermediate point so that it may receive the seat insert assembly at one of its ends and permit it to be moved into place within the body. Thus in the form illustrated in the drawing the tubular body 10 has a cylindrical inner seat receiving surface 30 therein extending throughout the length of the valve body from one of the end abutment faces 12 to the other face 14.

Into the tubular body member in accordance with the preferred form of this invention illustrated in the drawings, there is received a seat assembly employing an annular base member 32 which is of hard, strong and rigid material capable of sustaining the expected stress resulting from pressure differentials expected to be handled by the valve. It may, of course, be of the same material as the body or of some different material as the particular application of the valve may dictate.

Disposed within the respective end portions of the base member 32 are a pair of annular seat members of relatively soft, more resilient material compared to the base member. Generally these seat members may be made of a suitable elastomer inert to the materials to be handled by the valve and of an appropriate hardness to yield for the purpose of permitting the opening and closing of the valve but to resist flow under the pressure differentials expected to be handled by the valve and thus avoid extrusion through the small clearances remaining between hard, rigid parts of the valve under the arrangement of this invention.

The valve body is shown as provided with exterior oppositely projecting stem receiving portions having aligned bores 36 and 38 for receiving bearing bushings 40 and 42 to provide bearings for the valve stem 44 which extends transversely of the flow passage through the valve body. The seal assembly is likewise provided with openings aligned with the openings 36 and 38 so that the valve stem may pass through the opposite sides of the seal assembly and into the bearing sleeves 40 and 42, respectively.

Within the seat assembly the valve stem 44 passes through the opening provided therefor in the valve closure disc 46 which is in turn secured against endwise or rotary movement on the stem 44 by means of screws 48 or any other suitable arrangement.

It will be noted that the annular base member 32 has openings 50 therein for permitting passage of the stem 44, which openings 50 are slightly larger diameter than the outer diameter of the stem so there will be no frictional engagement between the two, and that the seat members 34 and 35 provide a small neck of seat material 52 extending into each opening 50 and surrounding the stem 44. It will further be noted that the openings 54 provided between the seat members 34 and 35 for the stem 44 to pass through, are frustoconical in shape rather than cylindical, so that their radially innermost portions grip the stem more tightly and provide a leak-poof seal around the stem to prevent leakage along the stem to the body 10 or the base member 32.

Each of the seat members 34 and 35 is provided on its outermost extremity projecting beyond the extremities of the base member 32, with projecting sealing ribs 58 and 60 adapted when the valve is placed between flanges as illustrated in FIG. 1 to provide a seal against each of such flanges and thereby seal the material being handled through the conduit from contact with either the base member 32 or the body 10. It will be appreciated that these annular sealing portions 58 and 60 extend slightly beyond the ends of the base member 32, which preferably is of the same axial extent as the body 10, but need not extend greatly therebeyond except to provide an initial seal against such flanges, because thereafter pressure of material being handled within the valve will tend to increase the internal pressure of the seat members and intensify the seal provided by the annular sealing portions 58 and 60, as well as the seal provided around the stem by the frustoconical portions of the seat members as they grip the stem about the openings 54. The seat members 34 and 35 have tapering zones 62 and 64 respectively remote from their exposed ends and tapering to smaller diameters adjacent the central or median plane of the valve body and the base member 32, and surrounding the openings 54 through which the valve stem 44 extends, these members 34 and 35 are provided with substantially flat surfaces 66 adapted to receive the end portions of the hub of the disc 46 and provide a resilient sealing engagement therewith as the same is rotated by the shaft 44.

Intermediate the ends of the valve and between the two seat members 34 and 35 is a radially inwardly projecting member 68 which serves as a dam between the two seat members 34 and 35 and extends inwardly to provide only a slight clearance between its innermost edge and the outermost seating edge surface of the disc 46. The nature and order of this clearance can be observed readily in FIG. 4.

In order to provide a continuous coverage of the resilient material of the character forming the annular seat members 34 and 35 and prevent contact of material being handled with the inner edge of the dam 68, these two seat members may be interconnected across the inner edge of the dam by means of a continuous integral flash web 70 extending across the inner edge of the dam throughout its periphery. It will be understood that the seat members 34 and 35 may be molded in place within the annular base member 32 and bonded to this member and to the dam 68, or may be separately formed and secured in place as shown in FIG. 7 by whatever means is found suitable.

It will, of course, be appreciated also that the dam 68 may be formed or mounted within the body 10 in any suitable fashion as long as it extends inwardly between the two seat members 34 and 35 to provide a dam for each one against movement thereof toward the opposite end of the valve. In the drawing this dam 68 is shown integrally joined to the base 32 with the corners therebetween filleted to avoid sharp corners on the seat members 34 and 35 molded and bonded thereto, and the whole inserted as an assembly within the body 10. This is considered preferable and most advantageous as a manner of mounting the dam 68 within the body and also as a manner of integrating into an assembly the seat members 34 and 35 and the dam 68.

The seat members 34 and 35 are further provided with radially inwardly extending ribs 72 and 74 adjacent but on opposite sides of the dam 68 so that the portion of smallest internal diameter of each of the seat members is disposed adjacent the opposite sides of the dam. Then due to the tapering portions 62 and 64 the two seat members have larger internal diameters adjacent the opposite ends of the valve body.

It will be noted that although the inner surface of the body and the exterior surface of the base member are so formed that the latter may be moved endwise into and out of the former, other arrangements might be made for mounting the seal members within the body and on opposite sides of the dam. The web of elastomer integrally joining the two seal members 34 and 35 over the edge of the dam 68 is preferably of a slightly larger internal diameter than the external diameter of the edge of the disc 46, thereby leaving a slight clearance 76 between them. Thus the outer edge of the disc 46 will be located at every point a slightly lesser distance from the axis of the valve stem 44 than the adjacent edge of the dam 68 and the web 70 overlying it, but will be of slightly greater distance from the axis of the shaft 44 than the adjacent innermost portions 72 and 74 of the seat members when the same are in undistorted condition as in FIG. 5. By virtue of this arrangement, when the disc 46 is rotated to closed position as illustrated in FIG. 4 it will slightly deflect the edge portions 72 and 74 of the seat members and provide an initial seal with both throughout their entire peripheries.

In order that the disc member may rotate with greatest freedom and with least likelihood of damage to the lips 72 and 74, the same is rounded at its edges and tapered from the centralmost portion of greatest diameter toward the positions along which it engages the lips 72 and 74.

Preferably this is accomplished by making the sealing edge surface 88 of this disc spherical.

Referring again to FIG. 1, it will be noted that the end of the bore 38 in which the bearing sleeve 42 is mounted to provide a bearing for the lower end of the stem 44, is closed by some suitable means such as the pressed in disc 78, although it will be appreciated that in forming this opening it might have been possible to form it without it extending all the way through the casting of the valve body.

On the opposite side of the valve body the valve stem extension 80 of the valve body in which the bore 36 is formed for the reception of the bearing sleeve 40, terminates at its outer end in a counterbore 82 receiving packing or suitable sealing material of any well-known type. Through this packing the non-circular end of the stem 84 projects for engagement with a suitable handle or wrench for turning the stem and hence moving the valve from open to closed position and back again. In order to provide a means for engaging a detent on such handle or for indicating the position of the handle a flange 86 extending laterally from the portion 80 of the valve body may be provided adjacent the portion of the stem 84 that is adapted to receive the wrench or handle.

In operation, when the valve disc is in closed position as illustrated in FIG. 4, pressure against one side of the valve disc will also be impressed upon one of the seat members 34 and 35. If this seat member be 34, then such pressure of material being handled will be sealed against flow of the material between the seat member 34 and the adjacent flange against which the valve is mounted, by means of the annular sealing projection 58 of the seal member 34. Likewise, inasmuch as the inward projecting rib or lip 72 provides an interference type of initial seal against the outer surface 88 of the disc 46, leakage therebetween will be prevented. As the pressure of the material being handled is increased, past the point where the material of the seat member 34 would normally begin to flow through the space between the edge of the gate at 88 and the interior of the body at 30 or of the outer flange portion of the base member 32, it will be held against such flow by the engagement thereof with the dam 68. Inasmuch as there will be only the relatively small clearance between the inner edge of the dam and the outer surface 88 of the disc through which the material of the seat member 34 might be forced by the pressure of material being handled, and inasmuch as the material of this seat member in designing the valve may be chosen to be of such resistance to flow that it will not flow, under the pressures to be handled, through the clearance thus provided between the dam and the disc, this valve may handle pressures far in excess of those permissible by valves not employing the dam 68 or its equivalent, but merely elastomer type of seats as in previously known disc type valves. Furthermore, it will be apparent that such pressures may be held on either side of the disc 46, being held in one direction by one of the seat members 34 and in the other direction by the other seat member 35. Tests have shown that the possibilities of holding pressure with valves of the design just described and illustrated in the drawings make such a valve capable of holding pressures of at least six to ten times as great as those of previously known disc type valves with elastomer sealing members surrounding the same and providing a seat for the disc.

Furthermore, the valve provided by this invention is not only capable of operating against pressure in either direction, but may operate alternately against pressure in one direction and then in the other and there is no necessity for orienting it and placing it in a conduit to which flow is to be controlled.

Furthermore, the advantage of previous disc type valves such as that shown in the Stillwagon patent hereinbefore mentioned, in which the material being handled is kept from contact with the body of the valve or with any portion of the valve surrounding the seat member, is retained in this valve by virtue of the connection of the seat members 34 and 35 with a flash web of elastomer integral with and joining the two seat members across the inner edge of the dam 68.

With a valve of the character described, the elastomer of the seat members 34 and 35 may be so chosen that it will distort readily to the extent necessary for the operation of the disc 46 and hence will not require excessive torque for opening and closing the valve, but at the same time will be so resistant to flow that it cannot flow through the relatively small clearance between the inner edge of the dam 68 and the outer surface 88 of the disc.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A disc valve comprising a tubular body having an inner seat receiving surface and end faces providing abutment faces to facilitate the assembly of the body in a conduit, an inwardly projecting annular dam within said body intermediate its ends and composed of hard strong and rigid material capable of sustaining the expected stresses resulting from the pressure differentials expected to be handled by the valve, means for holding said annular dam against movement endwise toward either end of the body when the valve is in place within a conduit, and seating means comprising effectively a pair of annular seat members adjacent and on opposite sides of said dam whereby said dam will prevent each of them from being forced by pressure axially toward the other and of relatively softer more resilient material compared with said dam, each seat member extending radially inwardly slightly beyond the inner extremity of said dam throughout the extent thereof and such inwardly extending parts and the portions of said members adjacent thereto being free to flow axially away from the dam and distort radially outwardly, and a valve closure disc rotatably mounted in said body on an axis coincident with the median plane of said dam and the median plane of the disc, said disc having its outer edge surface of a smaller radial distance from said axis than the inner edge of said dam to clear the same when rotated on said axis and a greater distance from said axis than the undistorted inner portions of said seat members to deflect the same radially outwardly and provide initial sealing interference therewith substantially normal to the axis of the seat assembly members, said disc having its outer edge surface broad enough to bridge the space between the innermost portions of said seat members to sealingly engage both of them simultaneously whereby each of said members, when in contact with the outer edge surface of said disc throughout its circumference will serve as a one-way seal to prevent flow past it toward but not away from said dam.

2. A disc valve for controlling flow through a conduit comprising a tubular body having an inner seat receiving surface and end faces providing abutment faces to facilitate assembly of the body in a conduit, an inwardly projecting annular dam extending inwardly from the interior of said body intermediate its ends and of a hard strong and rigid material capable of sustaining the expected stresses resulting from the pressure differentials expected to be handled by the valve, seating means comprising effectively a pair of annular seat members of relatively softer more resilient material compared with said dam disposed adjacent and on opposite sides of said dam whereby said dam will prevent each of them from being forced by pressure axially toward the other and extending inwardly slightly beyond the inner extremity of said dam throughout the same, and such inwardly extending parts and the portions of said members adjacent thereto being free to flow axially away from the dam and distort radially outwardly, and a valve disc rotatably mounted in said body on an axis coincident with the median plane of said dam and a plane of maximum dimensions of said disc, said disc having its outer edge surface of radial distance from said axis smaller than the inner edge of said dam adjacent thereto to clear the dam when rotated on said axis and a greater distance from said axis than the undistorted innermost portions of said seat members to deflect the same radially outwardly and provide initial sealing interference therewith when substantially normal to the axis of the seat members, said disc extending in at least one direction from the plane of its major dimension throughout its periphery to provide an outer edge surface to sealingly engage one of said seat members when the disc is in position substantially normal to the axis of the seat assembly whereby either of said members, when in contact with the outer edge surface of said disc throughout its circumference will serve as a one-way seal to prevent flow past it toward but not away from said dam.

3. A disc valve for controlling flow through a conduit comprising a tubular body having an inner seat receiving surface and end faces providing abutment faces to facilitate assembly of the body in a conduit, an inwardly projecting annular dam extending inwardly from the interior of said body intermediate its ends and of a hard strong and rigid material capable of sustaining the expected stresses resulting from the pressure differentials expected to be handled by the valve, seating means comprising effectively a pair of annular seat members of relatively softer more resilient material compared with said dam disposed on opposite sides of said dam and extending inwardly slightly beyond the inner extremity of said dam throughout the same, and a valve disc rotatably mounted in said body on an axis coincident with the median plane of said dam and a plane of maximum dimensions of said disc, said disc having its outer edge surface of radial distance from said axis smaller than the inner edge of said dam adjacent thereto to clear the dam when rotated on said axis and a greater distance from said axis than the undistorted innermost portions of said seat members to deflect the same radially outwardly and provide initial sealing interference therewith when substantially normal to the axis of the seat members, said disc extending in at least one direction from the plane of its major dimension throughout its periphery to provide an outer edge surface to sealingly engage one of said seat members when the disc is in position substantially normal to the axis of the seat assembly, and said seat members being bonded to the opposite side faces of said dam so that each is backed up and held by said dam against movement toward the opposite end of the valve.

4. A disc valve for controlling flow through a conduit comprising a tubular body having an inner seat receiving surface and end faces providing abutment faces to facilitate assembly of the body in a conduit, an inwardly projecting annular dam extending inwardly from the interior of said body intermediate its ends and of a hard strong and rigid material capable of sustaining the expected stresses resulting from the pressure differentials expected to be handled by the valve, seating means comprising effectively a pair of annular seat members of relatively softer more resilient material compared with said dam disposed on opposite sides of said dam and extending inwardly slightly beyond the inner extremity of said dam throughout the same, and a valve disc rotatably mounted in said body on an axis coincident with the median plane of said dam and a plane of maximum dimensions of said disc, said disc having its outer edge surface of radial distance from said axis smaller than the inner edge of said dam adjacent thereto to clear the dam when rotated on said axis and a greater distance from said axis than the undistorted innermost portions of said seat members to deflect the same radially outwardly and provide initial sealing interference therewith when substantially normal to the axis of the seat members, said disc extending in at least one direction from the plane of its major dimension throughout its periphery to provide an outer edge surface to sealingly engage one of said seat members when the disc is in position substantially normal to the axis of the seat assembly, and each seat member having its portion of smallest internal dimension adjacent said dam.

5. A disc valve for controlling flow through a conduit comprising a tubular body having an inner seat receiving surface and end faces providing abutment faces to facilitate assembly of the body in a conduit, an inwardly projecting annular dam extending inwardly from the interior of said body intermediate its ends and of a hard strong and rigid material capable of sustaining the expected stresses resulting from the pressure differentials expected to be handled by the valve, seating means comprising effectively a pair of annular seat members of relatively softer more resilient material compared with said dam disposed on opposite sides of said dam and extending inwardly slightly beyond the inner extremity of said dam throughout the same, and a valve disc rotatably mounted in said body on an axis coincident with the median plane of said dam and a plane of maximum dimensions of said disc, said disc having its outer edge surface of radial distance from said axis smaller than the inner edge of said dam adjacent thereto to clear the dam when rotated on said axis and a greater distance from said axis than the undistorted innermost portions of said seat members to deflect the same radially outwardly and provide initial sealing interference therewith when substantially normal to the axis of the seat members, said disc extending in at least one direction from the plane of its major dimension throughout its periphery to provide an outer edge surface to sealingly engage one of said seat members when the disc is in position substantially normal to the axis of the seat assembly, each of said seat members having its portion of smallest internal dimension adjacent said dam and tapering to a larger internal dimension adjacent the opposite ends of the valve.

6. A disc valve for controlling flow through a conduit comprising a tubular body having an inner seat receiving surface and end faces providing abutment faces to facilitate assembly of the body in a conduit, an inwardly projecting annular dam extending inwardly from the interior of said body intermediate its ends and of a hard strong and rigid material capable of sustaining the expected stresses resulting from the pressure differentials expected to be handled by the valve, seating means comprising effectively a pair of annular seat members of relatively softer more resilient material compared with said dam disposed on opposite sides of said dam and extending inwardly slightly beyond the inner extremity of said dam throughout the same, and a valve disc rotatably mounted in said body on an axis coincident with the median plane of said dam and a plane of maximum dimensions of said disc, said disc having its outer edge surface of radial distance from said axis smaller than the inner edge of said dam adjacent thereto to clear the dam when rotated on said axis and a greater distance from said axis than the undistorted innermost portions of said seat members to deflect the same radially outwardly and provide initial sealing interference therewith when substantially normal to the axis of the seat members, said disc extending in at least one direction from the plane of its major dimension throughout its periphery to provide an outer edge surface to sealingly engage one of said seat members when the disc is in position substantially normal to the axis of the seat assembly, said seat members being joined together by a continuous integral flash web of the same material as the seat members extending across the inner edge of the dam throughout its periphery.

7. A disc valve for controlling flow through a conduit comprising a tubular body having an inner seat receiving surface and end faces providing abutment faces to facilitate assembly of the body in a conduit, an inwardly projecting annular dam extending inwardly from the interior of said body intermediate its ends and of a hard strong and rigid material capable of sustaining the expected stresses resulting from the pressure differentials expected to be handled by the valve, seating means comprising effectively a pair of annular seat members of relatively softer more resilient material compared with said dam disposed on opposite sides of said dam and extending inwardly slightly beyond the inner extremity of said dam throughout the same, and a valve disc rotatably mounted in said body on an axis coincident with the median plane of said dam and a plane of maximum dimensions of said disc, said disc having its outer edge surface of radial distance from said axis smaller than the inner edge of said dam adjacent thereto to clear the dam when rotated on said axis and a greater distance from said axis than the undistorted innermost portions of said seat members to deflect the same radially outwardly and provide initial sealing interference therewith when substantially normal to the axis of the seat members, said disc extending in at least one direction from the plane of its major dimension throughout its periphery to provide an outer edge surface to sealingly engage one of said seat members when the disc is in position substantially normal to the axis of the seat assembly, said seat members, respectively, having annular sealing portions projecting, when in undistorted state, endwise beyond the respective end faces of said body.

8. A valve as set forth in claim 2 in which said disc has a plane of maximum dimension intersecting its radially outer edge throughout its periphery, and the outer edge of said valve closure disc is tapered from its plane of maximum dimension toward an adjacent annular seat member when said disc is in closed position.

9. A valve as set forth in claim 2 in which the outer edge surface of said disc is spherical.

10. A valve for controlling flow through a conduit comprising a tubular body having an inner seat receiving surface and end faces providing abutment faces to facilitate the assembly of the body in a conduit, a seat assembly within said body comprising an annular base member of hard strong and rigid material capable of sustaining the expected stress resulting from the pressure differential expected to be handled by the valve and having an inwardly projecting annular dam integral therewith intermediate its ends, seating means comprising effectively a pair of annular seat members adjacent and on opposite sides of said dam whereby said dam will prevent each of them from being forced by pressure axially toward the other, and said seat members being of relatively softer more resilient material compared to said base member, each seat member extending inwardly slightly beyond the inner extremity of said dam throughout the extent thereof, and said inwardly extending parts and the portions of said seat members adjacent thereto being free to flow axially away from the dam and distort radially outwardly, and a valve closure disc rotatably mounted in said seat assembly on an axis coincident with the median plane of said dam and the median plane of the disc and having its outer edge surface a smaller radial distance from said axis than the inner edge of said dam adjacent thereto to clear the same when rotated upon said axis and a greater distance from said axis than the undistorted innermost portions of said seat members to deflect the same radially outwardly and provide initial sealing interference therewith when substantially normal to the axis of the seat assembly.

11. A valve as set forth in claim 10 in which said disc has its outer edge surface broad enough to bridge the space between the innermost portions of said seat members to sealingly engage both of them simultaneously.

12. A valve for controlling flow through a conduit comprising a tubular body having an inner seat receiving surface and end faces providing abutment faces to facilitate the assembly of the body in a conduit, a seat assembly within said body comprising an annular base member of hard strong and rigid material capable of sustaining the expected stress resulting from the pressure differential expected to be handled by the valve and having an inwardly projecting annular dam integral therewith intermediate its ends, seating means comprising effectively a pair of annular seat members of relatively softer more resilient material compared to said base member, each seat member extending inwardly slightly beyond the inner extremity of said dam throughout the extent thereof, and a valve closure disc rotatably mounted in said seat assembly on an axis coincident with the median plane of said dam and the median plane of the disc and having its outer edge surface a smaller radial distance from said axis than the inner edge of said dam adjacent thereto to clear the same when rotated upon said axis and a greater distance from said axis than the undistorted innermost portions of said seat members to deflect the same radially outwardly and provide initial sealing interference therewith when substantially normal to the axis of the seat assembly, said seat assembly being within and extending from end to end of said body and having an exterior surface complementary to the inner surface of said body and adapted to fit therein.

13. A valve as set forth in claim 10 in which said dam has its juncture with the outer portion of said base member filleted.

14. A valve for controlling flow through a conduit comprising a tubular body having an inner seat receiving surface and end faces providing abutment faces to facilitate the assembly of the body in a conduit, a seat assembly within said body comprising an annular base member of hard strong and rigid material capable of sustaining the expected stress resulting from the pressure differential expected to be handled by the valve and having an inwardly projecting annular dam integral therewith intermediate its ends, seating means comprising effectively a pair of annular seat members of relatively softer more resilient material compared to said base member, each seat member extending inwardly slightly beyond the inner extremity of said dam throughout the extent thereof, and a valve closure disc rotatably mounted in said seat assembly on an axis coincident with the median plane of said dam and the median plane of the disc and having its outer edge surface a smaller radial distance from said axis than the inner edge of said dam adjacent thereto to clear the same when rotated upon said axis and a greater distance from said axis than the undistorted innermost portions of said seat members to deflect the same radially outwardly and provide initial sealing interference therewith when substantially normal to the axis of the seat assembly, said inner surface of the body and exterior surface of the base member being so formed that the latter may be moved endwise into and out of the former.

15. A valve for controlling flow through a conduit comprising a tubular body having an inner seat receiving surface and end faces providing abutment faces to facilitate the assembly of the body in a conduit, a seat assembly within said body comprising an annular base member of hard strong and rigid material capable of sustaining the expected stress resulting from the pressure differential expected to be handled by the valve and having an inwardly projecting annular dam integral therewith intermediate its ends, seating means comprising effectively a pair of annular seat members of relatively softer more resilient material compared to said base member, each seat member extending inwardly slightly beyond the inner extremity of said dam throughout the extent thereof, and a valve closure disc rotatably mounted in said seat assembly on an axis coincident with the median plane of said dam and the median plane of the disc and having its outer edge surface a smaller radial distance from said axis than the inner edge of said dam adjacent thereto to clear the same when rotated upon said axis and a greater distance from said axis than the undistorted innermost portions of said seat members to deflect the same radially outwardly and provide initial sealing interference therewith when substantially normal to the axis of the seat assembly, said annular seat members being disposed within and bonded to said base member on opposite sides of said dam so that each seat member is backed up and held by said dam against movement toward the opposite end of the valve.

16. A valve for controlling flow through a conduit comprising a tubular body having an inner seat receiving surface and end faces providing abutment faces to facilitate the assembly of the body in a conduit, a seat assembly within said body comprising an annular base member of hard strong and rigid material capable of sustaining the expected stress resulting from the pressure differential expected to be handled by the valve and having an inwardy projecting annular dam integral therewith intermediate its ends, seating means comprising effectively a pair of annular seat members of relatively softer more resilient material compared to said base member, each seat member extending inwardly slightly beyond the inner extremity of said dam throughout the extent thereof, and a valve closure disc rotatably mounted in said seat assembly on an axis coincident with the median plane of said dam and the median plane of the disc and having its outer edge surface a smaller radial distance from said axis than the inner edge of said dam adjacent thereto to clear the same when rotated upon said axis and a greater distance from said axis than the undistorted innermost portions of said seat members to deflect the same radially outwardly and provide initial sealing interference therewith when substantially normal to the axis of the seat assembly, each seat member having its portion of smallest internal dimension adjacent said dam.

17. A valve for controlling flow through a conduit comprising a tubular body having an inner seat receiving surface and end faces providing abutment faces to facilitate the assembly of the body in a conduit, a seat assembly within said body comprising an annular base member of hard strong and rigid material capable of sustaining the expected stress resulting from the pressure differential expected to be handled by the valve and having an inwardly projecting annular dam integral therewith intermediate its ends, seating means comprising effectively a pair of annular seat members of relatively softer more resilient material compared to said base member, each seat member extending inwardly slightly beyond the inner extremity of said dam throughout the extent thereof, and a valve closure disc rotatably mounted in said seat assembly on an axis coincident with the median plane of said dam and the median plane of the disc and having its outer edge surface a smaller radial distance from said axis than the inner edge of said dam adjacent thereto to clear the same when rotated upon said axis and a greater distance from said axis than the undistorted innermost portions of said seat members to deflect the same radially outwardly and provide initial sealing interference therewith when substantially normal to the axis of the seat assembly, each of said seat members tapering to a larger inner dimension adjacent the opposite ends of the assembly.

18. A seat assembly for a valve adapted for fitting within a valve body and comprising an annular base member of hard strong rigid material capable of sustaining the expected stresses resulting from the pressure differential expected to be handled by the valve and adapted to be received within the valve body, said annular base member having an inwardly projecting annular dam fixed to and immovable relative thereto intermediate its ends, and seating means comprising effectively a pair of annular seat members of relatively softer more resilient material compared to said base member disposed within said base member on opposite sides of said dam so that each is backed up and held by said dam against movement toward the opposite end of the base and each seat member extending inwardly slightly beyond the inner extremity of said dam throughout the extent of the dam.

19. A seat assembly as set forth in claim 18 in which each of said annular seat members is bonded to said base member on opposite sides of said dam and also to said dam.

20. A seat assembly as set forth in claim 18 in which said seat members are joined together by a continuous integral flash web of the same material as said seat members extending across the inner edge of the dam throughout the extent of the dam.

21. A seat assembly as set forth in claim 18 in which each seat member has its portion of smallest internal dimension adjacent said dam.

22. A seat assembly as set forth in claim 18 in which each of said seat members tapers to a larger internal dimension toward the adjacent end of the valve.

23. A seat assembly as set forth in claim 18 in which said dam has its juncture with the outer portion of said base member filleted.

24. A seat assembly as set forth in claim 21 in which each seat member tapers to a larger internal dimension toward the adjacent end of the valve and said dam has its juncture with the outer portion of said base member filleted.

References Cited
UNITED STATES PATENTS

| | | | |
|---|---|---|---|
| 2,740,423 | 4/1956 | Stillwagon | 251—306 X |
| 2,883,149 | 4/1959 | Fiorentini | 251—306 |
| 3,129,920 | 4/1964 | Stillwagon | 251—306 X |
| 3,233,861 | 2/1966 | Stillwagon | 251—306 X |

FOREIGN PATENTS

| | | |
|---|---|---|
| 111,911 | 6/1962 | Pakistan. |

M. CARY NELSON, *Primary Examiner.*

R. C. MILLER, *Assistant Examiner.*